P. W. WILCOX.
OXYACETYLENE CUTTING TORCH.
APPLICATION FILED SEPT. 5, 1916.
1,324,866.  Patented Dec. 16, 1919.
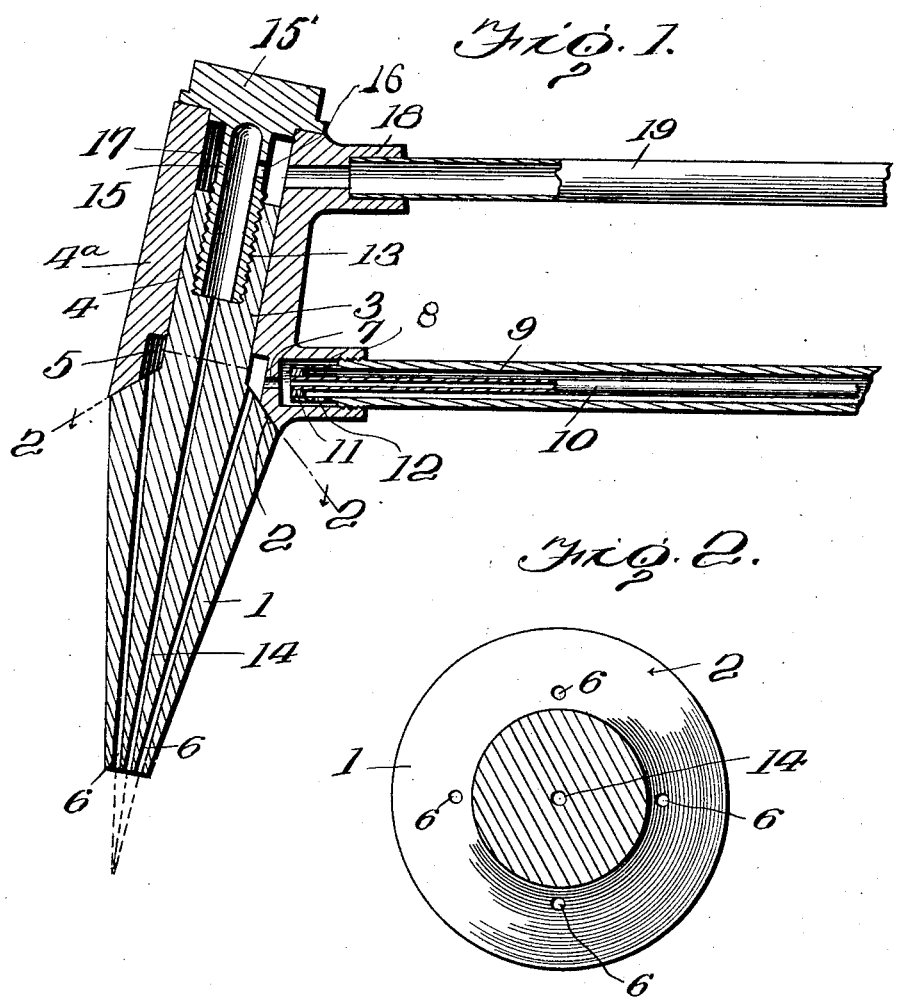

UNITED STATES PATENT OFFICE.

PHILIP WAKEMAN WILCOX, OF ATLANTA, GEORGIA, ASSIGNOR TO BIRD-WILCOX CO., INC., OF ATLANTA, GEORGIA, A CORPORATION OF GEORGIA.

OXYACETYLENE CUTTING-TORCH.

1,324,866.     Specification of Letters Patent.     Patented Dec. 16, 1919.

Application filed September 5, 1916. Serial No. 118,545.

*To all whom it may concern:*

Be it known that I, PHILIP WAKEMAN WILCOX, a citizen of the United States, residing at Atlanta, in the county of Fulton, State of Georgia, have invented certain new and useful Improvements in Oxyacetylene Cutting-Torches, of which the following is a description, reference being had to the accompanying drawing and to the figures of reference marked thereon.

My invention relates to improvements in oxyacetylene cutting torches.

The object of my invention is to provide a cutting torch of this character in which the pre-heating flame and the cutting flame are focused so that the cutting flame strikes the exact point the preheated flame has most intensely heated and thus obtaining the greatest possible efficiency from the cutting flame.

Another object of my invention is to provide a simple, cheap and effective construction of torch, adapted to accomplish the before mentioned results.

In the accompanying drawings:

Figure 1 is a vertical sectional view of my torch showing the focusing point of the four pre-heated jets and the oxygen jet in dotted lines;

Fig. 2 is a transverse sectional view taken on the line 2—2 Fig. 1;

Fig. 3 is an end view of the burner showing the relative position of the several jet orifices.

Referring now to the drawings, 1 represents the tip portion of my improved torch, which is of an elongated tapering form and made of any material adapted to withstand intense heat, to which it is subjected. The upper end of the tip has inwardly slanting walls 2, terminating in the upper reduced portion 3 having parallel walls 4. Secured to the upper reduced portion and surrounding the same is a head 4ª which has a slanting lower end resting upon the slanting walls 2 of the tip portion and forming a tight joint therewith. The lower end of the head is provided with an annular chamber 5 which is arranged opposite the upper portion of the slanting walls 2. Extending from the slanting walls 2 downwardly are four pre-heating gas passages which extend through the lower flat end 6 of the tip portion and are so focused that they meet at a point about one half an inch below the end 6 as shown in dotted lines in Fig. 1.

The head 4ª is provided with an opening 7 communicating with the annular chamber 5 and opposite the opening is an enlarged outwardly extending nipple 8. Screwed within the nipple is a pipe 9 through which the acetylene gas passes to the chamber. Passing through the pipe 9 is a second pipe 10 through which the oxygen passes and the inner end of the pipe is directly opposite the opening 7. Surrounding the inner end of the pipe 10 is a ring 11 which closes the end of the acetylene pipe 9 and said pipe is provided with openings 12 to allow the acetylene to pass from the pipe.

The reduced upper end of the tip portion has an enlarged screw threaded recess 13 therein and communicating with the lower end of the recess is the oxygen opening 14 which extends down to the lower end 6 of the tip portion midway between the pre-heating passages 6, as clearly shown in Fig. 3.

Closing the upper end of the head 4ª is a cap 15' which has a hollow downwardly externally screw threaded extension 15 screwed into the threaded recess 13 in the tip portion and whereby the head is clamped upon the tip portion. The extension 15 is provided with an opening 16 which communicates with the surrounding space or chamber 17 above the tip portion. The head is provided with a nipple 18 communicating with the chamber 17 and in which is secured the pipe 19 for supplying oxygen to the chamber 17.

By the above description it will be seen that I have provided a simple construction and arrangement of parts whereby the several parts of the torch may be assembled or removed and the pre-heating and oxygen jets so arranged that they meet at a point about one half an inch from the lower end of the tip portion, thus obtaining the greatest efficiency with the least fuel, as the cutting frame strikes the same point, as the pre-heating flame.

Having thus described my invention, what I claim as new and desire to secure by Letters Patent, is:—

1. A torch of the character described, comprising a tip having a reduced upper end, a head resting upon the tip below the reduced upper end and forming a chamber, said tip having passages communicating with the chamber and extending downwardly and focused to meet at a point below the lower end, an acetylene supply for said chamber, a cap closing the upper end of the head and having a screw-threaded connection with the reduced upper end of the tip, a passage leading downwardly through the tip, and an oxygen supply for said passage.

2. A torch of the character described, comprising a tip having a reduced upper end, a head surrounding the reduced upper end of the tip and forming a chamber surrounding the lower end of the reduced portion, an oxygen and acetylene supply for said chamber, said head forming a chamber above the reduced end of the tip, a cap closing the upper end of the head and having a screw-threaded connection with the reduced portion of the tip for clamping the head thereon, a gas supply for said upper chamber and said tip having a central passage leading from its lower end to the upper chamber.

3. A torch of the character described, comprising a tip having a reduced upper end, a head surrounding the reduced upper end and forming an annular chamber, an oxygen and acetylene gas supply for said chamber, pre-heating passages leading from the chamber to the end of the tip and focused to meet at a point below the same, a cap closing the upper end of the head and forming a chamber, an oxygen supply for the chamber and a passage communicating with the chamber and extending down through the tip between the pre-heating passages.

4. A torch of the character described, comprising a tapering tip having inwardly slanting walls terminating in a reduced upper end, a head resting upon the slanting walls and forming an annular chamber, passages communicating with the chamber and extending downwardly through the tip and focused to meet at a point below the lower end thereof, an oxygen and acetylene gas supply for said chamber, the upper end of the reduced tip having a screw-threaded recess and a passage communicating therewith and extending down through the lower end of the tip centrally between the preheating passages, a cap closing the upper end of the head and having a hollow extension screwed into the threaded recess, said extension having an opening communicating with the passage therearound and an oxygen supply for said chamber.

5. The combination in a torch, of a tip having an inwardly beveled wall terminating in a reduced upper end, a head surrounding the reduced upper end of the tip and having a beveled lower end resting on the beveled wall of the tip, said head being cut away on its inner periphery above the beveled wall of the tip forming an annular chamber, an oxygen and acetylene gas supply for said chamber, preheating passages leading from the chamber to the end of the tip and focused to meet at a point below the same, an oxygen chamber at the upper end of the head, a passage communicating with said chamber and extending down through the tip between the preheating passages, and a cap closing the upper end of the head and adapted to force the same downwardly upon the beveled wall of the tip.

In testimony whereof, I affix my signature, in the presence of two witnesses.

PHILIP WAKEMAN WILCOX.

Witnesses:
  GROVER MIDDLEBROOKS,
  A. R. BRITTAIN.